April 22, 1958 R. W. SMITH 2,831,370
BICYCLE TOE CLIP
Filed Aug. 28, 1956

INVENTOR
Robert W. Smith
BY Kenon & Palmer
ATTORNEYS

United States Patent Office 2,831,370
Patented Apr. 22, 1958

2,831,370

BICYCLE TOE CLIP

Robert W. Smith, Langhorne, Pa.

Application August 28, 1956, Serial No. 606,598

5 Claims. (Cl. 74—594.6)

This invention relates to improvements in toe clips for attachment to the pedals of bicycles and other pedal propelled vehicles.

It is the object of this invention to provide a bicycle toe clip of simplified construction which may be readily attached to or detached from a bicycle pedal.

It is a further object of this invention to provide a bicycle toe clip having a toe engaging portion and a pedal clamping portion that is constructed principally from a single substantially T-shaped blank of sheet metal.

Further objects and advantages will be apparent from the following specification taken in connection with the accompanying drawings, in which.

Figure 1:
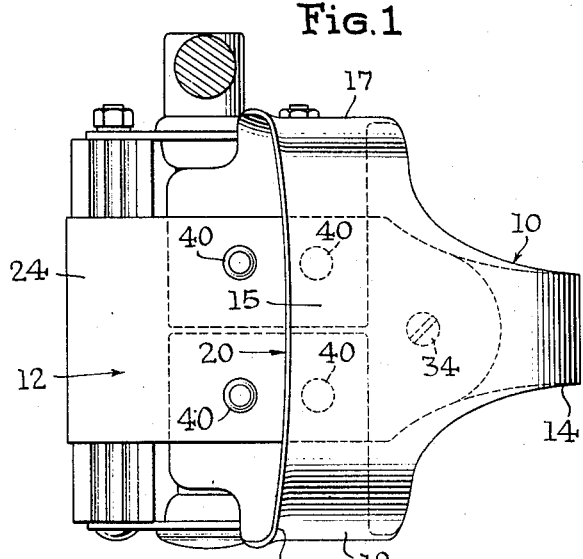
Figure 1 is a top plan view of a preferred embodiment of the invention.

Referring now to the drawings, the toe clip comprises a toe engaging portion 10 and a pedal clamping portion 12. The toe engaging portion of the toe clip includes a front 14, top 15, bottom 16 and sides 17 and 18 for enclosing and engaging the operator's foot, which may be inserted through a rearwardly extending opening 20. The rear uppermost part or top 15 of the toe engaging portion 10 is flared outwardly of the opening 20 as indicated at 22, so that its edge will not cause an uncomfortable pressure on the operator's foot.

Figure 2:
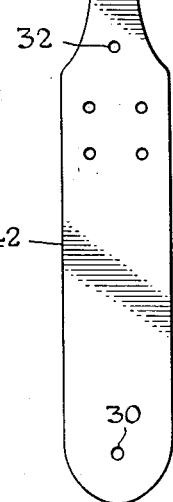
Figure 2 is a side elevation of the device shown in Figure 1.
Figure 2:
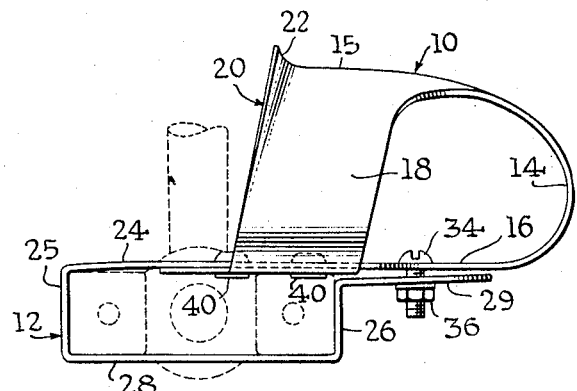

The pedal clamping portion 12 of the clip, which is preferably integral with the toe engaging portion, includes a base 24 extending along the plane of the top of the pedal, and vertically extending portions 25 and 26 connected by a horizontal portion 28 overlying the under side of the pedal. The base 24, vertical portions 25 and 26, and horizontal portion 28 encircle the periphery of the pedal. Attached to the vertically extending member 26 is a generally horizontally extending fastening tongue 29 having an opening 30 therethrough which, when positioned as shown in Figures 1 and 2, underlies a corresponding opening 32 in the toe enclosing portion 10. Suitable fastening means such as a screw 34 is passed through openings 30 and 32. A nut 36 attached to the screw 34 secures the pedal clamping portion 12 to the toe engaging portion 10. The horizontally extending fastening tongue 29 is located generally in a plane slightly below the base 24 of the toe engaging portion 10. By this arrangement, when the fastener is tightened, the size of the pedal clamping portion defined by base 24 and portions 25, 26 and 28, is diminished, thereby applying a clamping pressure to the rubber pads of the pedal to securely anchor the clip on the pedal.

Figure 3:
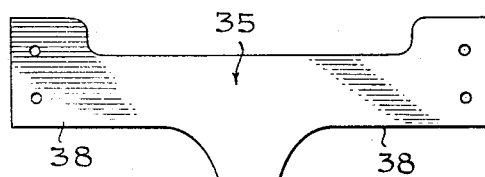
Figure 3 is a plan view of a sheet metal blank from which the clip is constructed.

The preferred form of the toe clip is formed from the substantially T-shaped blank 35 shown in Figure 3. The neck 36 of this T-shaped blank is bent upwardly to form the front 14 of the toe engaging portion 10, and the ends 38 of the top of the T-shaped blank are bent downwardly and toward each other to underlie the base 24 of the pedal clamping portion 12. These ends 38 are fastened to the base 24 by suitable means such as rivets 40. The remainder of the stem of the T 42 is bent to form the pedal encircling portion.

It can be seen from the above description that the improved toe clip can be readily and inexpensively formed from a unitary metal blank and that it may be securely clamped around both pads of a bicycle pedal with only a single nut and bolt.

From the foregoing, it will be apparent to those skilled in the art that there is herein shown and described a new and useful bicycle toe clip. While a preferred embodiment is shown in the drawing and described in the specification, applicant is entitled to the benefit of a full range of equivalents within the scope of the appended claims.

I claim:

1. A safety toe clip for attachment to an occupant propelled vehicle pedal of the type having parallel resilient pads comprising: a unitary piece of metal formed to provide a toe receiving pocket and including a rearwardly extending pedal clamping portion formed to encircle the periphery of the entire outside pedal; and fastening means connecting the end of the pedal clamping portion to the toe receiving portion for clamping the clip securely around the pedal.

2. A safety toe clip for attachment to a bicycle pedal of the type having parallel resilient pads, and formed from a substantially T-shaped metallic plate comprising: a toe enclosing portion having front, top, side walls, and bottom defining a rearwardly extending toe pocket; an integral pedal clamping portion having a cross section substantially conforming to the outside periphery of the entire pedal and further including a forwardly extending tongue underlying the bottom of the enclosing portion; and means for fastening the end of the tongue to the toe enclosing portion, thereby decreasing the cross sectional area of the pedal clamping portion for securely attaching the clip to the resilient pads of the pedal.

3. A toe clip as defined in claim 2 wherein the upper portion of said toe enclosing portion includes an outwardly flared rearmost edge.

4. A safety toe clip for attachment to a bicycle pedal of the type having parallel resilient pads and formed from a unitary metal blank comprising: a toe enclosing portion enclosing the top, sides, bottom and front of a toe pocket; an integral rearwardly extending pedal clamping portion, said pedal clamping portion being formed to enclose the tops, bottoms, and exposed sides of the resilient pads of the pedal; and fastening means for attaching the forward end of said pedal clamping portion to the bottom of said toe enclosing portion to thereby clamp said clip securely around the resilient pads of the pedal.

5. A safety toe clip for attachment to an occupant propelled vehicle pedal of the type having parallel resilient pads comprising: means to receive the toe portion of an operator's shoe including a D-shaped portion for surrounding the top, bottom and sides of the toe of the operator's shoe and an integral forwardly extending C-shaped portion for surrounding the top, bottom and forwardmost part of the operator's shoe; means to surround the exposed peripheral edges of the resilient pads of the pedal, said means being integral with the remainder of the clip; and clamping means for decreasing the size of the pedal surrounding portion for securely attaching the clip to the resilient pads of the pedal.

References Cited in the file of this patent

UNITED STATES PATENTS 722,056     Thiem et al. ------------ Mar. 3, 1903

FOREIGN PATENTS 2,450     Austria ---------------- Oct. 10, 1900